Aug. 5, 1924.
E. E. STROM
1,503,723
CLUTCH MECHANISM FOR POWER DRIVEN TOOLS
Filed Sept. 2, 1922     2 Sheets-Sheet 1
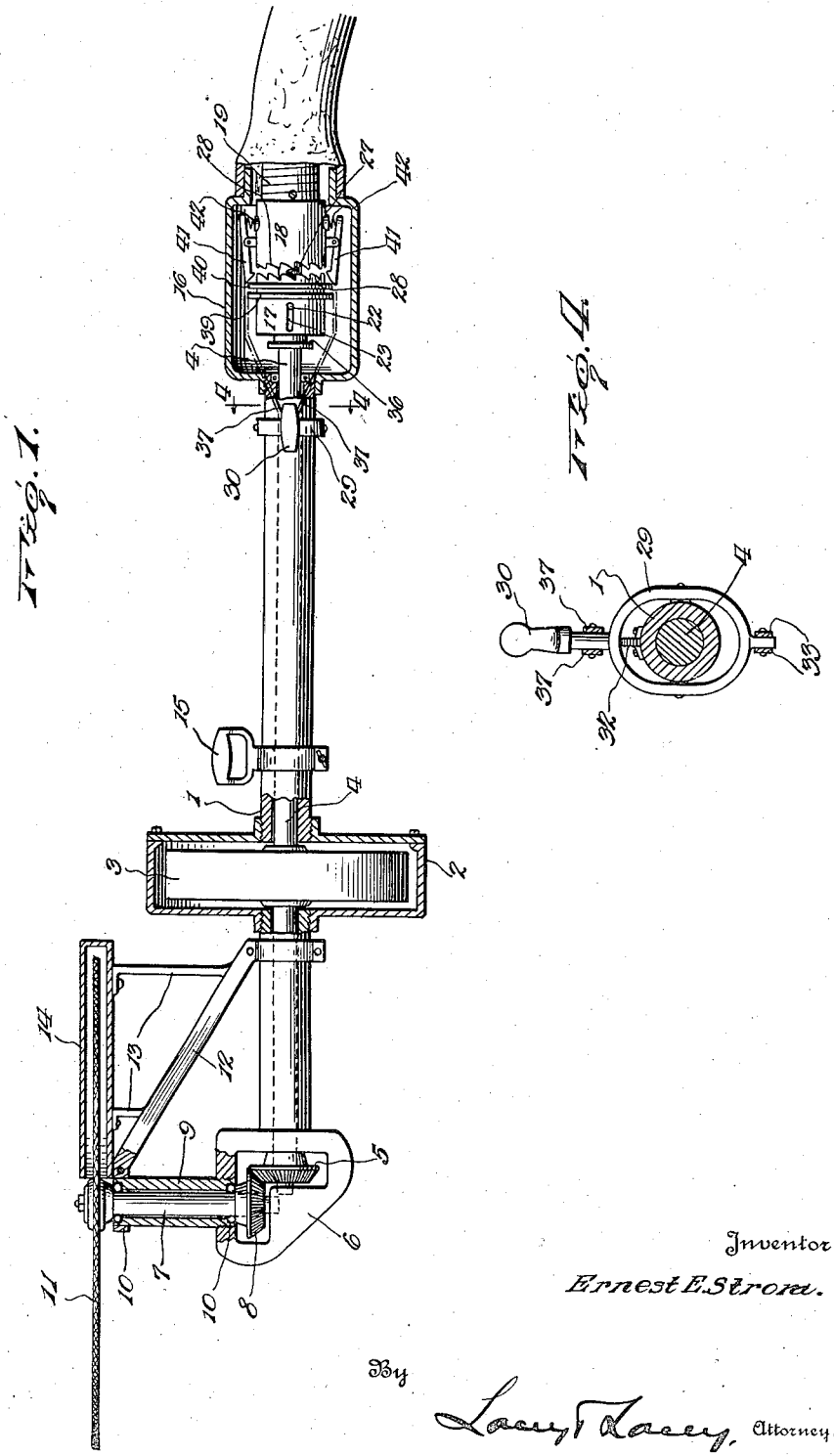
Inventor
Ernest E. Strom.
By Lacey & Lacey, Attorneys

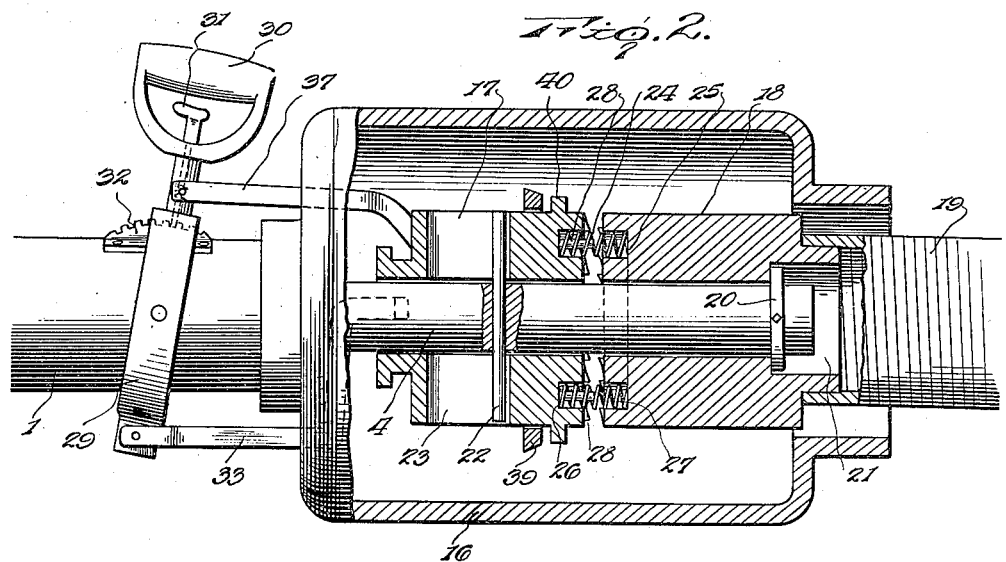
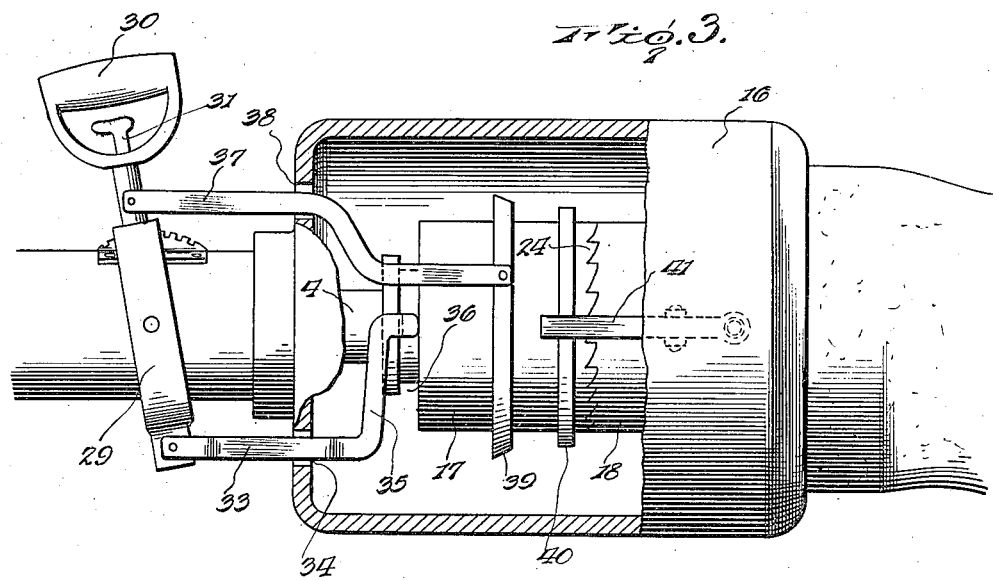

Patented Aug. 5, 1924.

1,503,723

UNITED STATES PATENT OFFICE.

ERNEST E. STROM, OF COLOME, SOUTH DAKOTA.

CLUTCH MECHANISM FOR POWER-DRIVEN TOOLS.

Application filed September 2, 1922. Serial No. 585,917.

*To all whom it may concern:*

Be it known that I, ERNEST E. STROM, a citizen of the United States, residing at Colome, in the county of Tripp and State of South Dakota, have invented certain new and useful Improvements in Clutch Mechanism for Power-Driven Tools, of which the following is a specification.

This invention relates to power-driven tools which may be supported and guided by the hands of the workman and directed for use wherever desired. The invention seeks to provide means whereby a tool may be driven at an even speed, and also seeks to provide simple and efficient means whereby the tool may be connected with or disconnected from the driving shaft at the will of the user. These stated objects and other objects which will incidentally hereinafter appear are attained in such an apparatus as is illustrated in the accompanying drawings.

In the drawings—

Figure 1 is a plan view, partly broken away and in section, of a portable saw embodying my invention;

Fig. 2 is an enlarged longitudinal section through the clutch mechanism showing the clutch disconnected;

Fig. 3 is an enlarged elevation showing the clutch connected, the housing for the clutch being shown in section;

Fig. 4 is a detail transverse section on the line 4—4 of Fig. 1.

In carrying out my present invention, I employ a tubular casing 1 which is preferably constructed in two parts connected by a circular housing 2 to accommodate a fly wheel 3. The said fly wheel 3 is secured rigidly upon a shaft 4 which extends axially through the housing 1 and is equipped at its front end with a beveled gear 5 arranged within a guarding bracket 6 which may be formed integral with the front end of the housing 1 or rigidly secured thereto in any desired manner. The housing bracket 6 provides a bearing for the front extremity of the shaft 4 and also for the inner end of the saw arbor 7 which carries a beveled gear 8 meshing with the gear 5 so that motion of the shaft 4 will be imparted directly to the saw arbor. The saw arbor is preferably arranged axially through a sleeve 9, and anti-friction bearings 10 are preferably provided at the ends of this sleeve. The outer end of the saw arbor projects through the outer end of the said sleeve and a circular saw 11 of any well-known or preferred form is secured to the outer end of the arbor in the usual manner. A bracing arm 12 extends between the housing 1 and the outer end of the sleeve 9 and is securely fastened thereto so as to maintain the right angular relation of said members, as shown in Fig. 1. Upon the outer side of the brace 12 are secured brackets 13 which carry the saw guard 14 which may be of any preferred or well-known form. A handle 15 is provided at any convenient point of the housing 1 so that the same may be supported and guided by the user.

The rear end of the housing 1 is secured to the front end of a clutch casing 16 and the end of the shaft 4 extends into said casing, as clearly shown. Loosely mounted upon the rear end of the shaft 4 are the clutch sleeves 17 and 18, the rear clutch sleeve 18 having the front end of the flexible driving shaft 19 rigidly secured thereto. The shaft 4 is provided with an annular stop collar 20 adjacent its rear extremity which fits within a circular recess 21 in the rear end of the clutch member 18 and abuts the forward wall of said recess so as to prevent endwise separation of the clutch member from the transmission shaft 4. It will be readily noted that relative rotation of the clutch sleeve 18 and the shaft 4 is permitted, but relative rotation of the clutch sleeve 17 and the shaft 4 is prevented by a locking pin or key 22 inserted through the shaft and having its ends disposed within a longitudinal slot 23 of the clutch sleeve. The sleeve may thus be shifted longitudinally of the shaft but cannot rotate about the shaft so that, while the clutch sleeve 17 may be moved to and from the clutch sleeve 18 at will, when the two sleeves are in engagement the rotation of the sleeve 18 will be transmitted to the shaft 4 and the saw 11 will be driven. Mating teeth 24 are provided upon the opposed end faces of the clutch sleeves so that, when the sleeve 17 is shifted rearwardly, the teeth will engage and the said sleeve will be forced to rotate with the sleeve 18. The sleeve 18 is provided in its forward face with an annular groove or recess 25 and the sleeve 17 is provided in its rear end with a plurality of longitudinally extending sockets 26, coiled springs 27 being received at one end within the said sockets and having their opposite ends disposed within the annular recess or groove. Guiding pins 28 are also provided in the sockets so as to centralize the springs and prevent them slipping from the sockets. These springs tend constantly to expand so that they facilitate the releasing of the clutch when the operation of the saw is to be discontinued, and they also serve as shock-absorbing members to cushion the engagement of the clutches and thereby prevent damage to the mating teeth 24. To effect engagement and release of the clutch sleeves, I provide a yoke 29 which encircles the housing 1 and is pivotally mounted thereon. The upper end of this yoke is equipped with a handle 30, and a spring-controlled latch 31 is housed within the handle and adapted to engage a rack 32 fixed upon the housing whereby the yoke will be held in a set position and the engagement or release of the clutch members maintained. To the lower end of the yoke 29, I pivotally attach the outer ends of the links 33, which extend rearwardly from the yoke and pass through openings 34 provided therefor in the front end of the casing 16. The rear ends of these links are so formed, as at 35, as to extend inwardly to the plane of the axis of the shaft 4 and the clutch sleeves and their extremities are properly shaped to engage within an annular groove 36 provided at the front end of the clutch sleeve 17. The rocking of the yoke 29 will obviously effect longitudinal reciprocation of the links 33 which will be imparted directly to the clutch sleeve 17 so that it will be shifted longitudinally of the transmission shaft 4 and the teeth 24 on said sleeve moved into or out of engagement with the mating teeth on the clutch sleeve 18. Pivotally attached at the upper end of the yoke 29 are links 37 which extend rearwardly therefrom through openings 38 in the front end of the casing 16 and have their rear ends attached to a ring or collar 39 which is slidably mounted upon the clutch sleeve 17. Adjacent its rear end, the said clutch sleeve 17 is provided with an annular rib or flange 40 and pivotally mounted upon the clutch sleeve 18 are latches 41 which are adapted to engage over the said rib or flange when the clutch sleeves are in engagement so as to retain the engaged relation. Coiled springs 42 disposed between the sleeve 18 and the rear ends of the latches cause them to automatically engage the said flange when the clutch sleeves are brought together. It will be readily noted that the collar 39 is beveled rearwardly so that it may ride readily under the free ends of the latches 41 and, consequently, the rearward movement of the said collar will release the latches from the rib or flange 40 so that the clutch may be opened.

From the foregoing description, taken in connection with the accompanying drawing, it will be readily seen that I have provided an efficient portable saw which may be readily transported from point to point and may be driven from a distant motor and applied to work wherever needed and may be employed upon any work to which a circular saw is adapted. When the clutch is thrown in, the motion of the flexible driving shaft will be imparted to the transmission shaft 4 and thence imparted directly to the saw arbor. The motion of the saw may be instantly arrested by merely releasing the clutch and it is not necessary to stop the motor when the rotation of the saw is to cease. When the clutch is in open position as illustrated in Fig. 1, the latches 41 are disposed in rear of the flange 40 upon the forward clutch sleeve and extend toward the said clutch sleeve under the influence of the springs bearing upon their rear ends. If the yoke 29 be now rocked so that the lower links 33 are moved rearwardly, the flange 40 will ride under the beveled heads of the latches and cause them to swing outwardly and ride over the flange and to engage the front side thereof just as the mating teeth 24 come into engagement. When it is desired to open the clutch, the yoke 29 is rocked in the opposite direction and there is sufficient play of the extremities of the links 33 within the groove 36 to accommodate a slight rearward movement of the collar or ring 39 prior to releasing movement of the clutch sleeve 17. This lost motion will permit the said collar or ring to be carried against the beveled ends of the latches 41 under the rearward movement of the links 37 so that the said latches will be disengaged from the rib or flange 40, whereupon the expansion of the springs 27 will effect a slight separation of the clutch sleeves and the continued movement of the yoke 29 will then draw the clutch sleeve 17 from the sleeve 18 under the pull of the links 33.

My device is exceedingly simple in the construction and arrangement of its parts so that it may be operated efficiently at a low cost and is not apt to get out of order. It will be readily noted that the moving parts are all protected by the supporting and enclosing elements so that injury to the operator is not apt to occur.

Having thus described the invention, what is claimed as new is:

1. In an apparatus for the purpose set forth, the combination of a transmission shaft, a clutch member loosely fitted upon the transmission shaft and secured to a driving shaft, a second clutch member slidably mounted upon the transmission shaft and constrained to rotate therewith, means for shifting the second-mentioned clutch member into or out of engagement with the first-mentioned clutch member, a flange upon the second-mentioned clutch member, latches upon the first-mentioned clutch member adapted to engage said flange, a collar loosely mounted on the second-mentioned clutch member, and means for shifting said collar into engagement with the latches whereby to release the latches from the flange.

2. In an apparatus for the purpose set forth, the combination of a transmission shaft, a clutch member loosely fitted upon the transmission shaft and secured to a driving shaft, a second clutch member slidably mounted upon the transmission shaft and constrained to rotate therewith, means for shifting the second-mentioned clutch member into or out of engagement with the first-mentioned clutch member, a flange upon the second-mentioned clutch member, latches upon the first-mentioned clutch member adapted to engage said flange, and means mounted upon the second-mentioned clutch member for releasing said latches.

3. In an apparatus for the purpose set forth, the combination of a transmission shaft, a clutch member mounted loosely upon said shaft and secured to a driving shaft, a second clutch member slidable upon the transmission shaft but constrained to rotate therewith, a flange upon the second clutch member adjacent the rear end thereof, latches mounted upon the first clutch member and adapted to engage said flange, a yoke disposed in advance of the clutch members and mounted for rocking movement, a link extending from the lower end of said yoke and operatively engaged with the second-mentioned clutch member, a collar loosely fitted upon the said second clutch member, and a link extending from the upper end of the yoke to the said collar whereby said collar may be caused to engage the latches and release the same.

In testimony whereof I affix my signature.

ERNEST E. STROM. [L. S.]